March 31, 1942. C. A. TOCE ET AL 2,278,038
TWO-CYCLE ENGINE
Filed Aug. 23, 1941    3 Sheets—Sheet 3

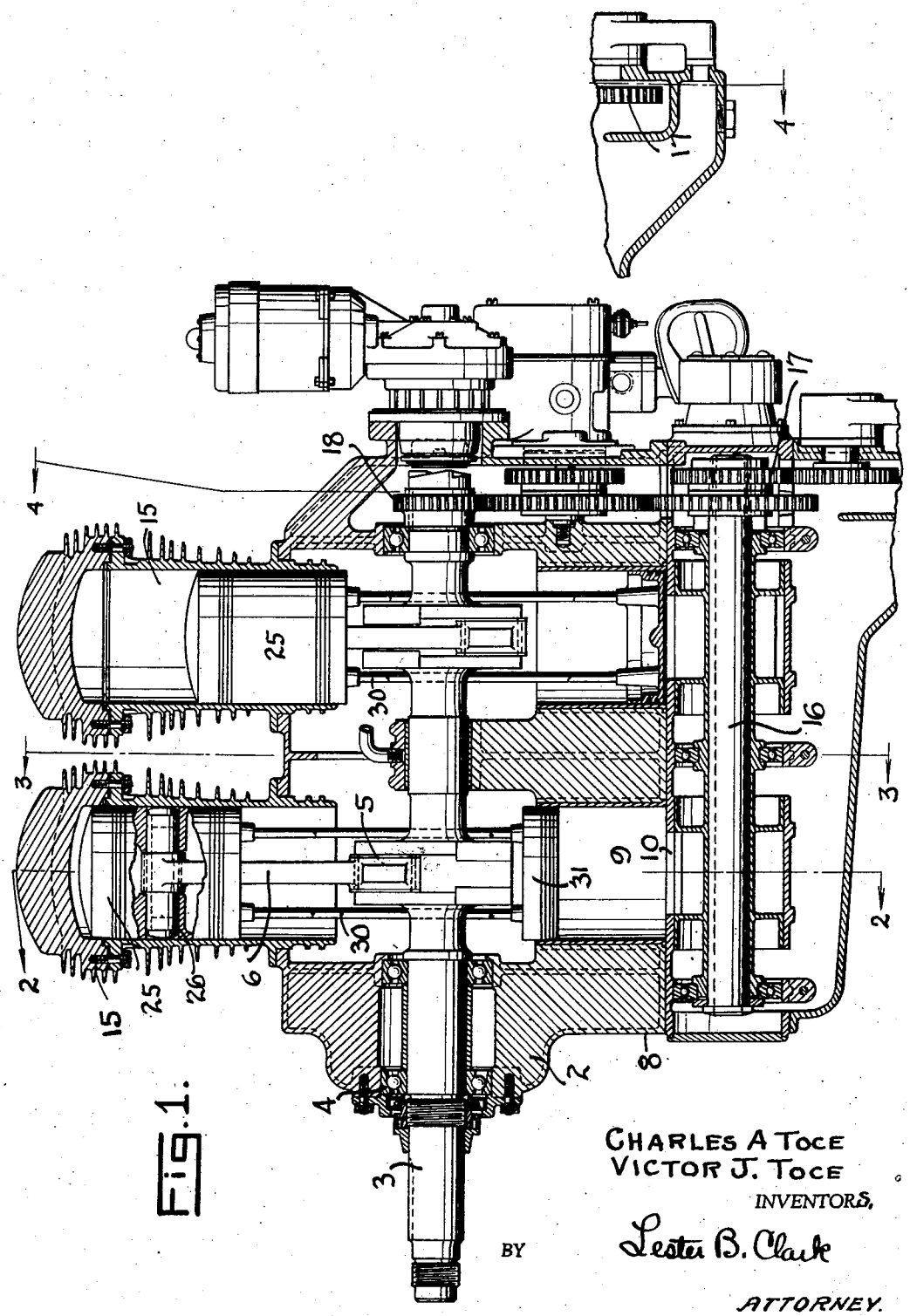

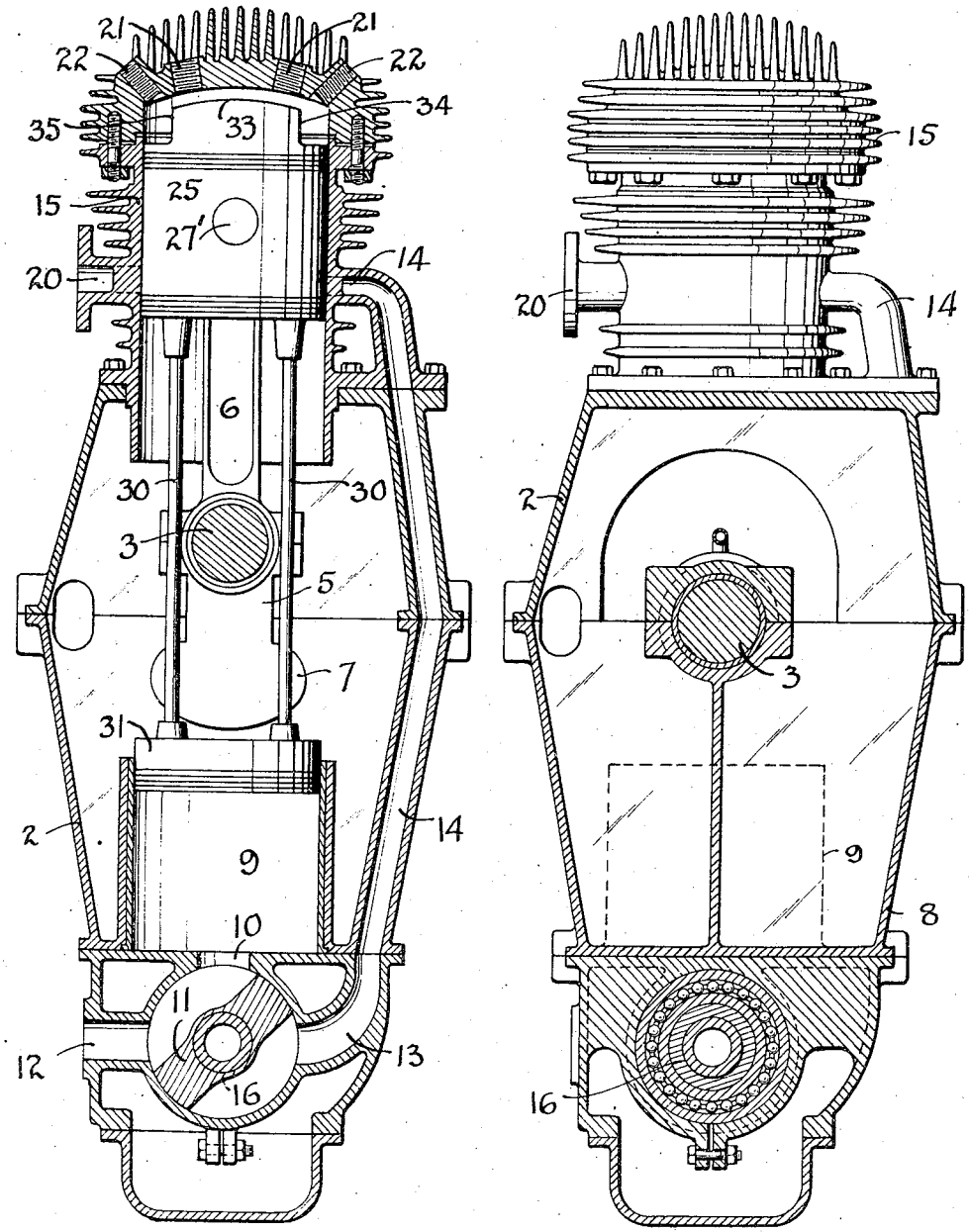

CHARLES A TOCE
VICTOR J. TOCE
        INVENTORS

BY   Lester B. Clark.
            ATTORNEY

Patented Mar. 31, 1942

2,278,038

UNITED STATES PATENT OFFICE 2,278,038

TWO-CYCLE ENGINE

Charles A. Toce and Victor J. Toce, Houston, Tex.

Application August 23, 1941, Serial No. 408,030

4 Claims. (Cl. 123—56)

The invention relates to a two-cycle internal combustion engine of the pre-compression type and specifically includes an arrangement whereby compressed air is fed into the cylinder to scavenge the cylinder and the fuel thereafter injected into the combustion chamber.

With two-cycle internal combustion engines various arrangements have been provided heretofore for pre-compressing the explosive mixture and for scavenging the cylinders. Considerable difficulty has been encountered in these prior devices, however, because if the gaseous mixture forced into the combustion cylinder under pressure is to effect a complete scavenging of the combustion gases, it seems obvious that a percentage of the incoming explosive mixture will pass on through the exhaust opening with the combustion gases, so that there has been difficulty in designing an engine whereby satisfactory scavenging could be obtained on the one hand and the economical use of fuel on the other hand.

The present invention contemplates a solution of this problem by pre-compressing air from the atmosphere and using this air as a scavenging medium and after this scavenging operation has been completed and a body of this compressed air trapped in the combustion chamber, then the fuel is injected and the explosion promoted. In this manner it is not imperative that the arrangement of the engine be such that there be no escape of the incoming compressed air through the exhaust port, but as a matter of fact, some of the incoming air may pass out the exhaust port in order to obtain a satisfactory scavenging of the cylinder.

It is, therefore, one of the objects of the invention to pre-compress air and use it in scavenging a two-cycle internal combustion engine and then inject fuel into the trapped compressed air to obtain an explosive mixture in the combustion chamber.

Another object of the invention is to pre-compress air and control its flow to the combustion chamber in a two-cycle engine of the pre-compression type.

Another object of the invention is to control pre-compressed air in its flow through the combustion chamber by means of a rotary valve.

Another object of the invention is to provide a combination of a compression chamber and a rotary valve in two-cycle internal combustion engines.

Still another object of the invention is to provide a combination piston and compression unit wherein the piston operates in the combustion chamber and a compression head operates in a pre-compression chamber.

Still another object of the invention is to provide a rigid assembly wherein a piston and compression head are in axial alignment.

Still another object of the invention is to arrange a two-cycle internal combustion engine with compression and combustion chambers on opposite sides of a crankshaft.

Still another object of the invention is to provide a bypass for pre-compressed air from the compression chamber to the combustion chamber of a two-cycle internal combustion engine.

Other and further objects of the invention will be readily apparent when the following description is considered in connection with the accompanying drawings wherein:

Fig. 1 is a longitudinal section through an engine constructed in accordance with the invention and showing certain parts in elevation.

Figs. 2 and 3 are sections taken on the line 2—2 and 3—3, respectively, of Fig. 1.

Figure 4:
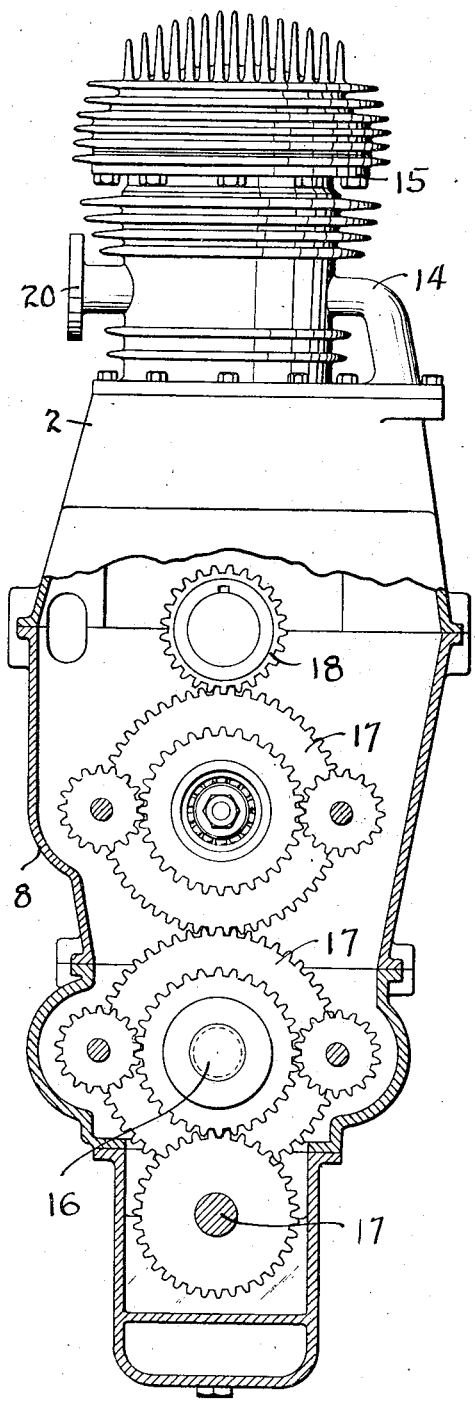
Fig. 4 is a section taken on the line 4—4 of Fig. 1.

In Fig. 1 the body of the engine is illustrated at 2 and may be of any desired type of construction which is arranged to support a crankshaft 3 by means of the plurality of sets of bearings such as 4. The present form shows a two-cylinder engine wherein the crankshaft has the throw portions 5 arranged to receive the connecting rod 6 of each cylinder. The base portion 8 of the body is arranged with a compression cylinder 9, which is best seen in Fig. 2, as having a port 10 controlled by the rotary valve 11. An inlet 12 into the valve is shown as being opened while the head moves up to permit the inlet of air to the chamber 9. The outlet 13 from the compression chamber is connected to the conduit 14 which is, in turn, connected into the combustion cylinder 15.

The valve 11 may be driven by the valve shaft 16 from the gear train 17 which is, in turn, driven by the gear 18 on the crankshaft 3. Suitable antifriction bearings and the usual connections for such gearing have been provided.

The combustion cylinder 15, as seen in Fig. 2, has the bypass 14 arranged partway along the cylinder so as to provide for the inlet of compressed air. The exhaust or outlet 20 is shown as being on the opposite side from the inlet but it may be arranged otherwise if desired. The head of this cylinder contains openings 21 which may receive spark or ignition plugs, and the openings 22 may contain suitable injectors for fuel.

Figure 5:
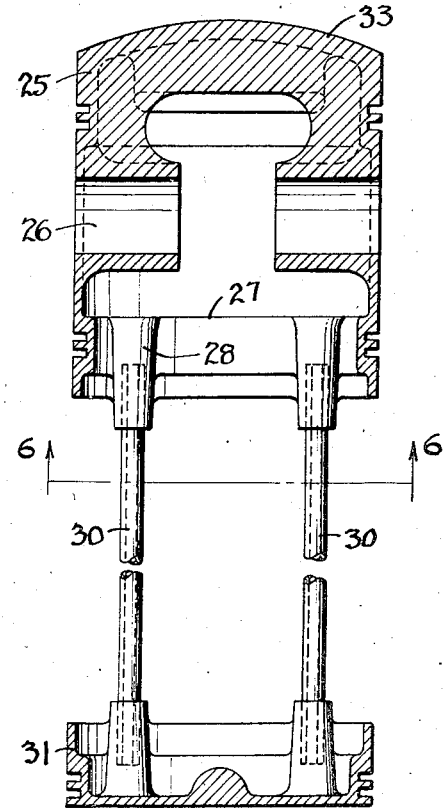
Fig. 5 is a vertical sectional view of the piston and compression unit.

The piston and compression unit is seen in side elevation in Fig. 2 and in section in Fig. 5 wherein the piston 25 has the wrist pin openings 26 to receive the wrist pin 27' carried by the connecting rod 6.

Figure 6:
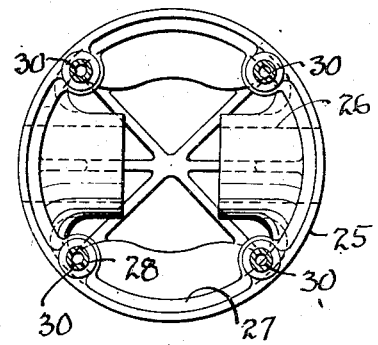
Fig. 6 is a section taken on the line 6—6 of Fig. 5.

The piston 25 is of the barrel type and has a particular construction in the form of a supporting rib 27 adjacent the lower end of the piston. This rib has the bosses 28 thereon, which are seen in Fig. 6 as being four in number. These bosses each receives a rod 30 which may be rigidly connected in the boss in any desired manner. These rods are spaced circumferentially around the piston on quarter points, as seen in Fig. 6, with a view of straddling the crankshaft 3 in one direction and allowing the operation of the throw 5 of the crank and its counter-weight 7 in a transverse direction. In other words, these rods straddle the crankshaft and support the compression head 31 on their lower ends.

The compression head 31 is in the form of a short piston which is arranged to reciprocate in the compression cylinder 9. In this manner the combustion cylinder and the compression cylinder are diametrical with regard to the crankshaft, as is readily apparent from Fig. 2. This piston and compression unit is a rigid assembly so that the compression and combustion cylinders are in direct alignment.

The head of the piston 25 has the baffle portion 33 thereon, as seen in Fig. 2, so that the face 34 tends to deflect the incoming compressed air and cause it to circulate in the combustion chamber, while the opposite face allows the opening of the exhaust port 20 as the piston moves down. In this manner complete scavenging of the combustion cylinder is obtained because the ports and the piston can be so constructed and arranged that the amount of compressed air to be fed into the cylinder will be sufficient to obtain complete scavenging of the combustion gases.

This is true because the exhausting of some of the compressed air along with the combustion gases will not affect the economy of the engine as regards fuel.

The righthand side of Fig. 1 shows the usual mechanism for injection of the fuel and operation of the electric systems which are well known with internal combustion engines and need not be here described in detail.

In operation, as the piston moves down to uncover the inlet connection 14, there will be an inflow of compressed air from the compression cylinder 9. The valve 11 will be so timed as to open on the downstroke of the compression head at such time as to allow the compressed air to feed through the bypass 14 and enter the combustion cylinder 15.

The inlet of the compressed air into the combustion cylinder scavenges the combustion gases therefrom, driving them out the exhaust port 20.

As the piston reverses its stroke and closes the inlet and outlet valves, there will be a body of compressed air trapped in the combustion cylinder. The piston moves up to effect further compression of this air. At a suitable period in this operation, the desired amount of fuel will be injected into the compressed air so as to obtain an explosive mixture. The ignition of this mixture will occur at the proper time to effect the explosion and power stroke of the engine.

During this upstroke operation the valve 11 will open, as seen in Fig. 2, to permit the inlet of air to the compression chamber, and this valve will close on the downstroke so that the air in the chamber 9 and the bypass 14 will be compressed. The valve 11 is of such width that the inlet 12 and outlet 13 will never be interconnected.

Broadly, the invention contemplates a two-cycle engine wherein the pre-compression of air is controlled by a rotary valve and compressed air is used in the scavening operation.

What is claimed is:

1. A combination piston and compression unit for engines including a piston having a wrist pin connection therein, a compression head comprising a short rigid portion, and a plurality of rigid rods connecting said piston and head in axial alignment.

2. A combination piston and compression unit for engines including a piston, a compression head, and a plurality of rigid rods connecting said piston and head in axial alignment, said rods being spaced to provide for the operation of a connecting rod and crankshaft therebetween.

3. A multicylinder two-cycle internal combustion engine including a body, a crankshaft therein, a set of axially disposed cylinders on opposite sides of said crankshaft, one of each set being a combustion cylinder, another of each set being a compression cylinder, a piston and compression unit extending about said crankshaft and having a piston for said combustion cylinder and a head for said compression cylinder, a rotary valve to control the inflow and outflow of air relative to said compression chamber, means connected to conduct the outflow to said combustion chamber, and additional means to inject fuel into said combustion chamber.

4. A multicylinder two-cycle internal combustion engine including a body, a crankshaft therein, a set of axially disposed cylinders on opposite sides of said crankshaft, one of each set being a combustion cylinder, another of each set being a compression cylinder, a piston and compression unit extending about said crankshaft and having a piston for said combustion cylinder and a head for said compression cylinder, a rotary valve to control the inflow and outflow of air relative to said compression chamber, means connected to conduct the outflow to said combustion chamber, and additional means to inject fuel into said combustion chamber, said combustion chamber being scavenged by the inflow of air prior to the injection of fuel.

CHARLES A. TOCE.
VICTOR J. TOCE.